Victor G. Klein,
Lutwin C. Rotter,
George Waitzel,
Inventors.
Koenig and Pope,
Attorneys.

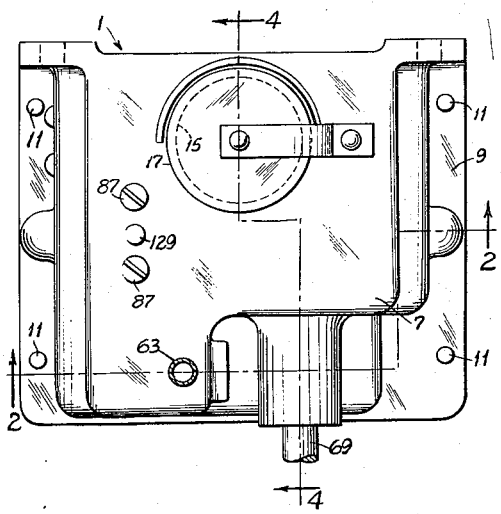

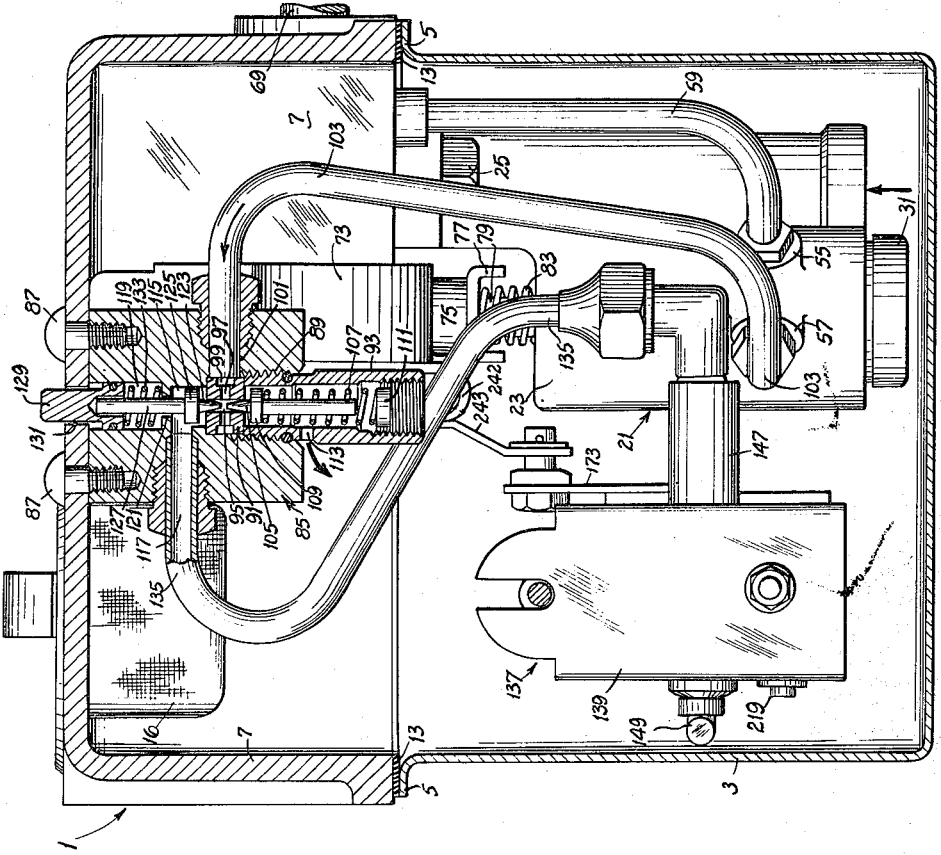

Oct. 2, 1956     V. G. KLEIN ET AL     2,765,050
APPARATUS FOR PERIODICALLY DELIVERING LUBRICANT UNDER PRESSURE
Filed May 13, 1954     4 Sheets-Sheet 4

Victor G. Klein,
Lutwin C. Rotter,
George Weitzel,
Inventors.
Koenig and Pope,
Attorneys

United States Patent Office

2,765,050
Patented Oct. 2, 1956

---

2,765,050

APPARATUS FOR PERIODICALLY DELIVERING LUBRICANT UNDER PRESSURE

Victor G. Klein, Defiance, Lutwin C. Rotter, Maplewood, and George Weitzel, Woodson Terrace, Mo., assignors to The McNeil Machine & Engineering Company, Akron, Ohio, a corporation of Ohio Application May 13, 1954, Serial No. 429,444

4 Claims. (Cl. 184—27)

This invention relates to apparatus for periodically delivering lubricant under pressure, and more particularly to a power take-off unit for automatically periodically actuating and charging lubricant injectors in a lubricating system of the type wherein various points of a power-driven device requiring lubrication are to be periodically lubricated by the injectors.

Among the several objects of the invention may be noted the provision of an improved lubricating apparatus of the class described including a lubricant reservoir and a lubricant pump for pumping lubricant from the reservoir and delivering it under pressure to a line supplying one or more lubricant injectors, in which the pump is continuously driven through a power take-off from the power-driven device, and in which the output of the pump is by-passed to the reservoir during intervals between periods of delivery of lubricant under pressure to the injector line; the provision of lubricating apparatus of this class including a timing mechanism driven by the power take-off for determining the intervals between delivery of lubricant to the injector line, the timing thereby being independent of the viscosity of the lubricant being pumped; the provision of apparatus of this class in which the lubricant to be supplied to the injectors is also utilized as a lubricant for the elements of the apparatus; the provision of lubricating apparatus of this class wherein provision is made for manual cycling of the injectors at will; and the provision of apparatus of this class which is economical to manufacture and reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

Fig. 1 is a plan view of a lubricating apparatus of this invention;

Fig. 2 is a vertical cross section taken on line 2—2 of Fig. 1, and with parts further broken away and shown in section;

Fig. 3 is a horizontal cross section taken on line 3—3 of Fig. 2, following the lower surface of a head of the apparatus, parts being omitted and parts being further broken away and shown in section;

Fig. 5 is a reduced vertical cross section taken on line 5—5 of Fig. 4, parts being further broken away and shown in section;

Fig. 6 is an enlarged vertical cross section taken on line 6—6 of Fig. 5;

Fig. 9 is a reduced cross section taken on line 9—9 of Fig. 7, with parts shown in a moved position.

Corresponding reference characters indicate corresponding parts throughout the several views of the drawings.

Figure 4:
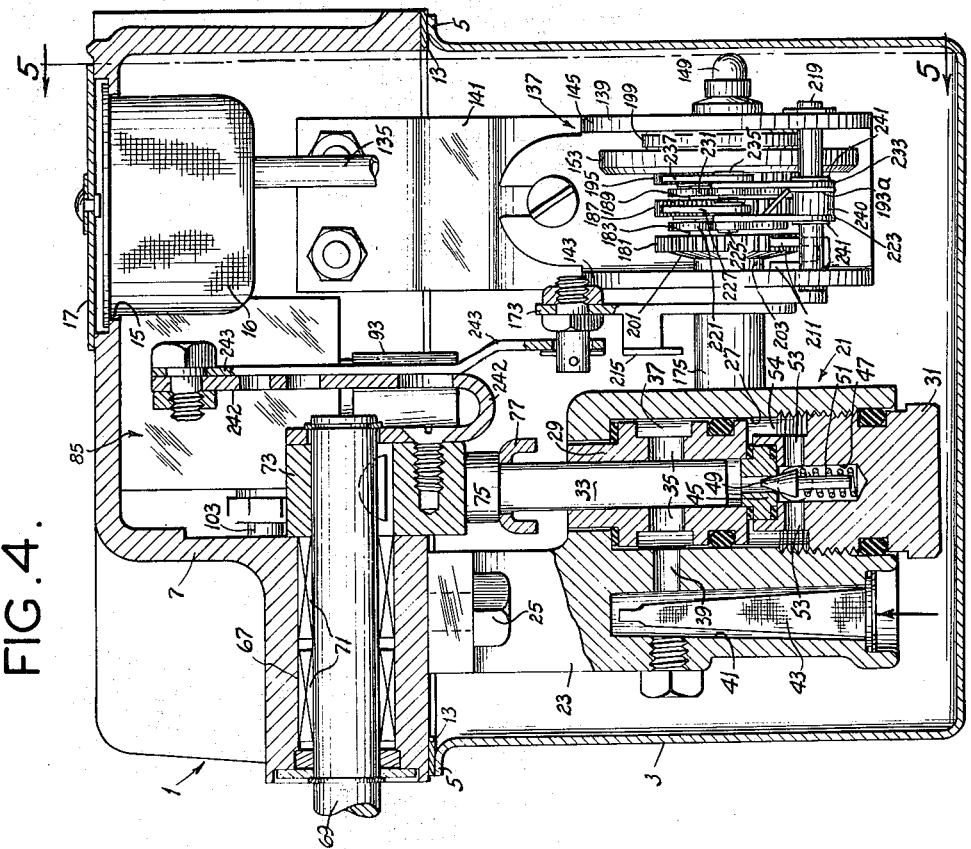
Fig. 4 is an enlarged vertical cross section taken on line 4—4 of Fig. 1.

Referring to the drawings, first more particularly to Figs. 1–6, a lubricating apparatus constructed in accordance with this invention is shown to comprise a lubricant reservoir designated in its entirety by the reference character 1. This comprises a sheet metal receptacle 3 having an outturned flange 5 at its rim, and a head casting 7 having a lower outturned flange 9 held on the flange 5 by screws 11, with a gasket 13 between the flanges. The head 7 has a top opening 15 for filling the reservoir with lubricant and a cap 17 for closing the filling opening. A strainer for straining lubricant poured in through opening 15 is indicated at 16 in Figs. 4, 5 and 6. A gauge glass for affording an indication of the level of the lubricant in the receptacle is indicated at 19 (see Fig. 2).

A lubricant pump generally designated 21 is fixed to the bottom of the head and extends downward from the head into the receptacle 3. The pump 21 comprises a body casting 23 fixed to the bottom of the head by screws 25. The body 23 has an offset portion formed with a vertical recess 27 in which is fitted a pump cylinder 29 (see Fig. 4). The cylinder is held in the recess by a fitting 31 threaded in the lower end of the recess. A pump plunger 33 is vertically reciprocable in the pump cylinder across radial cylinder ports 35. The radial ports 35 lead to the interior of the cylinder from an annular peripheral groove 37 around the cylinder. Groove 37 is in communication via an inlet passage 39 with an inlet chamber 41. The chamber contains a strainer 43 for lubricant entering the chamber from the receptacle 3.

The fitting 31 has a valve seat 45 at its upper end engaging the lower end of the cylinder 29. The fitting also has an upper axial recess 47 accommodating a check valve 49 biased in closing direction by a spring 51 toward the seat 45. The fitting has radial outlet passages 53 from recess 47 to a space 54 in the pump body 23 around the upper end of the fitting. The pump body has two outlet ports 55 and 57 (see Fig. 3) leading from this space 54.

An outlet line 59 leads from the outlet 55 to an outlet passage 61 in the head 7. Outlet passage 61 is adapted to have connected thereto a line 63 in extension of line 59 for supplying lubricant to injectors indicated diagrammatically at 65. These injectors are of a type which receive lubricant from the line 63, and which operate in response to development of a predetermined injector-cycling pressure in the line to inject a measured charge of lubricant, and which depend for resetting and reloading with another measured charge of lubricant upon relief of pressure in the line subsequent to injection. Injectors of this type are well-known in the art and require no further description, their detailed construction not being material to this disclosure. Disclosures of injectors of this type which might be used will be found in U. S. Patents 2,122,177, 2,141,022, 2,155,250, 2,283,638 and 2,448,583. The outlets of the injectors are connected to parts of a power-driven device requiring lubrication. A typical part to which the outlet of an injector is connected, for example, is a bearing. The power-driven device lubricated by the injector is not shown, its details not being material to this disclosure, except insofar as it provides a source of power for the lubricating apparatus of this invention.

The head 7 has a horizontal bore 67 receiving a power take-off shaft 69. Roller bearings for the shaft 69 are indicated at 71 in the bore. The inner end of the shaft is located above the pump plunger 33. Keyed on the inner end of the shaft is an eccentric 73 engageable with a head 75 on the upper end of the pump plunger 33. At 77 is indicated a crosshead which bears against the bottom of the head 75. At the ends of the crosshead 77 are downwardly extending studs 79 which reach into recesses 81 in the pump body 23 (see Fig. 5). Springs 83 surrounding the studs react from the bottoms of the recesses 81 against the crosshead for biasing the pump plunger 33 upward against the eccentric.

A valve block 85 (see Figs. 2 and 4–6) is attached to the inside of the head 7 as by screws 87. The valve block has a lower recess 89 (see Fig. 6). A valve seat member 91 is held against a shoulder at the upper end of the recess 89 by a fitting 93 threaded in the lower end of the recess. The valve seat member 91 has a vertical axial passage 95 and radial ports 97 providing communication between the axial passage and an annular peripheral groove 99. In one side of the block 85 (its right side as shown in Fig. 6) is an inlet port 101 in communication with the annular groove. A lubricant return line 103 is connected between the pump outlet 57 and the inlet port 101. A relief valve 105 is axially slidable in the fitting 93. This valve is biased upward toward a position closing the lower end of the axial passage 95 in the valve seat member 91 by a spring 107 which reacts against a collar 109 on the valve from a plug 111 threaded in the lower end of the fitting 93. The collar 109 has a loose fit in the fitting so that lubricant may flow around it and out through a lateral port 113 in the fitting 93 below the bottom of valve block 85.

Above the valve seat member 91, the valve block 85 has an intermediate recess 115 smaller than the lower recess 89. An outlet port 117 leads from recess 115 to the left side of the block as shown in Fig. 6. In the upper end of the valve block is an upper recess 119 which opens to the intermediate recess 115 through a small opening 121. A valve 123 has a collar 125 slidable in the recess 115 and a stem 127 which extends through the opening 121 into the upper recess 119. At the upper end of the stem 127 is a push button 129 which extends out of the head 7 through an opening 131. A spring 133 reacts from the bottom of the upper recess 119 against the push button to bias it outward to a retracted position such that the valve 123 may unseat from the top of the valve seat member 91. By pushing in on the button, the valve 123 may be held in position closing the upper end of the axial passage 95 in the valve seat member 91.

Figure 8:
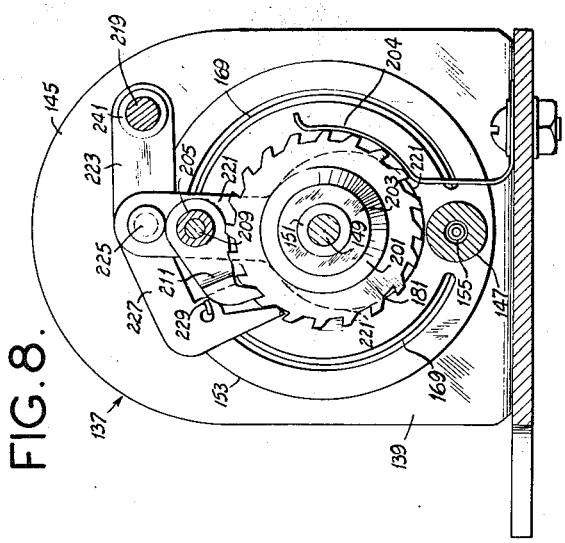
Fig. 8 is a reduced cross section taken on line 8—8 of Fig. 7.
Figure 7:
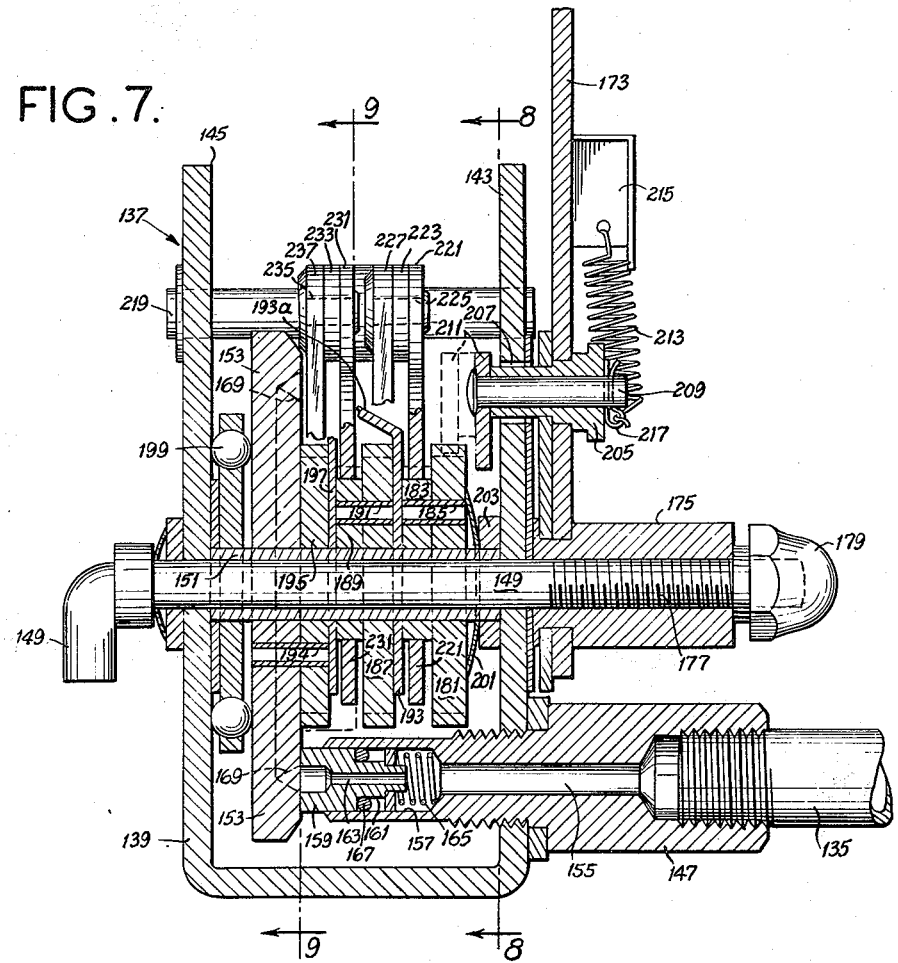
Fig. 7 is an enlarged cross section taken on line 7—7 of Fig. 5 illustrating a timer-controlled vent valve unit per se, the unit being turned upright.

A lubricant line 135 leads from the outlet port 117 in the valve block 85 in continuation of return line 103 to the inlet of a timer-controlled vent valve unit generally designated 137 (see particularly Figs. 7–9). This unit 137 is located in the reservoir 1. It comprises a U-shaped sheet metal frame 139 secured to a bracket 141 carried by the head 7. The side walls of the frame are designated 143 and 145. An inlet fitting 147 is fixed in an opening in side wall 143. Conduit 135 is connected to this fitting. The side walls serve as bearings for a shaft 149 extending parallel to the fitting. On the portion of the shaft between the side walls is a sleeve 151. Rotary on the sleeve is a disk valve 153. The inlet fitting 147 has an inlet passage 155 leading to a cylindrical recess 157 in its inner end. Slidable in this recess is a sealing member 159 having a reduced extension 161. The sealing member is passaged as indicated at 163 for flow of lubricant therethrough. A spring 165 in the recess biases the sealing member in the direction away from side wall 143 into sealing engagement with the side of the valve disk 153 toward the side wall 143. Packing for making a sliding seal is indicated at 167. The disk valve 153 has an arcuate groove of V-shape in cross-section in its side toward the side wall 143 extending for about 340° of arc on the radius of the passage 163. Between the ends of the grooves 169 is an ungrooved flat region 171 wider than the end of member 159.

The shaft 149 projects beyond the side wall 143 and a control arm 173 is mounted upon its projecting portion. The control arm 173 extends radially from a hub 175 threaded on the projecting end portion of the shaft. The shaft is threaded as indicated at 177 to receive the hub and an acorn nut 179 which is threaded up against the hub 175. With the nut 179 threaded against the hub, the hub 175 and arm 173 are locked to the shaft so that the oscillation of the arm results in oscillation of the shaft. Rotary on the sleeve 151 on the shaft 149 adjacent the side wall 143 is a first cluster of parts comprising a first ratchet 181 and a cam or eccentric disk 183. These parts are pinned together to form the cluster by a split tubular pin 185, with the ratchet 181 on the side toward wall 143. On the sleeve 151 adjacent the eccentric disk 183 is a second cluster of parts comprising a second ratchet 187 and a second cam or eccentric disk 189. These parts are pinned together to form the cluster by a split tubular pin 191. The second ratchet 187 is located adjacent the eccentric disk 183 with a spacer 193 between them. Pinned to the valve disk 153 by a split tubular pin 194 on its grooved side adjacent the eccentric disk 189 is a third ratchet 195. A spacer 197 is provided between the ratchet 195 and the disk 189. Between the disk valve 153 and side wall 145 of the frame 139 is a ball thrust bearing 199. Between the side wall 143 and the first ratchet 181 is a spring washer 201, backed by a spacer 203. The spring washer reacts from the spacer 203 against the first ratchet 181 frictionally to prevent it from rotating in reverse direction. The second ratchet 187 is prevented from rotating in reverse direction by a leaf spring brake 204 (see Fig. 8). The third ratchet 195 is prevented from rotating in reverse direction by the frictional engagement of member 159 with the valve disk 153. Fixed in an opening in the control arm 173 is a bushing 205. This extends from the control arm through an arcuate slot 207 (see Fig. 7) in the side wall 143. Rotary in this bushing is a pawl pivot pin 209. Fixed to the inner end of this pin on the inside of the side wall 143 is a pawl 211 engageable with the first ratchet 181. The pawl 211 is biased into engagement with the first ratchet by a tension spring 213 having one end connected to a bracket 215 on the control arm 173 and its other end connected to a cotter pin 217 at the outer end of pivot pin 209.

A pivot pin 219 is fixed at its ends in the side walls 143 and 145 extending parallel to the shaft 149 and offset from the plane of the shaft and the inlet fitting 147. Rotary on the first eccentric disk 183 is a strap 221. This is pin-connected at its upper end to one end of a pivot arm 223 pivoted at its other end on the pivot pin 219 (see Figs. 7 and 8). The pin connecting the strap 221 and the arm 223 is designated 225. Pivoted on this pin is a driving pawl 227 for the second ratchet 187. The pawl 227 is arranged to effect counterclockwise rotation (as viewed in Fig. 8) of the cluster comprising the second ratchet 187 and the second eccentric disk 189 in response to oscillation of the strap 221 by the eccentric disk 183. The pawl 227 is biased into engagement with the second ratchet 187 by means of a tension spring 229 connected at one end to the pawl and at its other end to the strap 221.

Rotary on the second eccentric disk 189 is a strap 231. This is pin-connected at its upper end to one end of a pivot arm 233 pivoted at its other end on the pivot pin 219 (see Figs. 7 and 9). The pin connecting the strap 231 and the arm 233 is designated 235. Pivoted on this pin is a pawl 237 located for engagement with the third ratchet 195. The pawl 237 is arranged to effect counterclockwise rotation (as viewed in Fig. 9) of the third ratchet 195 and the valve disk 153 in response to oscillation of the strap 231 by the eccentric disk 189. The pawl 237 is biased into engagement with the third ratchet 195 by means of a tension spring 239 connected at one end to the pawl and at its other end to the strap 231. Between arms 223 and 233 on pivot pin 219 is a spacer 240. The spacer 193 has an extension 193a which at its end has an opening receiving the pivot pin 219 and which is located between arm 233 and spacer 240 (see Fig. 4). Collars for holding arms 223 and 233 from sliding on the pivot pin are indicated at 241.

The control arm 173 of the above-described timing mechanism for the valve disk 153 is oscillated from the power take-off shaft 69 via a crank arm 242 on the inner end of the shaft and a link 243 connecting the crank arm and the control arm. Thus, the control arm 173 is oscillated through a cycle upon each revolution of the shaft 69. Upon each oscillation of the control arm, the pawl 211 acts to step the first ratchet 181 and the associated eccentric disk 183 through a fraction of a revolution which is determined by the stroke of the control arm and the number of teeth of the first ratchet.

Operation is as follows:

Shaft 69 is continuously driven through any suitable power take-off, such as a belt and pulley drive, from the device to be lubricated. This effects continuous operation of the pump 21 as long as the device to be lubricated is operating. It also effects step-by-step operation of the first ratchet 181 via the crank arm 242 at the inner end of the shaft, the link 243, the control arm 173 and the pawl 211 on the control arm. Upon each complete revolution of the first ratchet 181 and the associated eccentric disk 183, the first strap 221 is oscillated through one cycle by the rotation of the eccentric disk 183. Each cycle of the strap 221 results in one stroke of the driving pawl 227 for the second ratchet 187, and the latter is stepped counterclockwise through a fraction of a revolution corresponding to the throw of pawl 227. Upon each complete revolution of the second ratchet 187 and the associated eccentric disk 189, the second strap 231 is oscillated through one cycle by the rotation of the disk 189. Each cycle of the strap 231 results in one stroke of the driving pawl 237 for the third ratchet 195, and the latter and the valve disk 153 are stepped counterclockwise through a fraction of a revolution corresponding to the throw of the pawl 237.

Thus, in response to oscillation of the control arm 173, the main valve 153 is driven slowly in counterclockwise direction as viewed in Figs. 8 and 9 from the first ratchet 181 and the first eccentric disk 183 by the speed-reducing means comprising the strap 221, the pawl 227, the cluster 187—189, the strap 231, the pawl 237, and the ratchet 195. The speed reduction from the cluster 181—183 to the main valve 153 is determined by the number of teeth of ratchets 187 and 195 and the throw of the pawls 227 and 237. There is, of course, an initial reduction as between the shaft 69 and the cluster 181—183 by virtue of the pawl drive for the cluster 181—183.

Once each revolution of the valve 153, the flat ungrooved region 171 of the valve between the ends of the groove 169 in the disk blocks the end of the sealing member 159 for the length of time that it takes the valve 153 to rotate through the fraction of a revolution corresponding to the spacing of the ends of the groove. Throughout the remainder of a revolution of the valve 153, the end of the sealing member 159 is open to the groove and thus open to the reservoir 1. During all this time, the output of the pump (which, as previously noted, is continuously driven while the device to be lubricated is in operation) is diverted to the reservoir via the by-pass constituted by lubricant line 103, the annular groove 99 in the valve seat member 91, the radial ports 97 in member 91, the upper end of the passage 95, recess 115, outlet port 117, lubricant line 135, and the inlet fitting 147, flowing into the reservoir through the passage 163 in member 159, and the groove 169. The valve 123 is held up by the pressure of the lubricant to permit flow of lubricant from the upper end of passage 95.

When the valve disk 153 has rotated to the point where the end of the sealing member 159 is blocked by region 171 of the disk, the escape of lubricant back to the reservoir via the outlet port 117 in the valve block 85 and the lubricant line 135 is prevented. Under these circumstances, the output of the pump flows through the pump outlet 55 and lubricant line 59 to the outlet passage 61 in the head 7, and thence through the injector line 63 to the injectors 65. When the pressure of the lubricant in line 63 reaches a predetermined value, the injectors 65 are operated to inject measured charges of lubricant derived from line 63 to the various points of lubrication, such as bearings, of the device to be lubricated. Upon further increase of pressure, relief valve 105 opens against the bias of the spring 107 to prevent excessive build up of pressure. Spring 107 is selected and adjusted to allow valve 105 to open at an appropriate relief pressure. The relief is back to the reservoir via the lateral port 113 in the fitting 93. The relief valve flutters between its open and closed position until the valve disk, upon continued rotation, reaches the position where the leading end of the groove 169 comes into communication with the passage in the sealing member 159. This vents line 63 to the reservoir, and the injectors reset. The valve disk continues its rotation, and when it completes a revolution the injectors are again operated in the manner described. During the intervals between operation of the injectors, the output of the pump is by-passed to the reservoir as explained. The timing of the operation of the injectors is solely dependent upon the rate of rotation of the valve disk, and is not in any way dependent upon the viscosity of the lubricant.

Operation of the injectors may be obtained at any time, independently of the timing mechanism, by pushing in on and holding down the push button 129. This holds the valve 123 closed and blocks line 103, so that pressure may build up therein and in the pump outlet and in the injector line 63 to operate the injectors. When the relief valve 105 opens and flutters, the flutter can be sensed while holding the push button down. This apprises the operator that the injectors have operated, and that he may release the push button. Upon such release of the push button, and with the groove 169 in the valve disk in communication with the passage in member 159, the line 63 is vented back to the reservoir so that the injectors reset and reload.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Lubricating apparatus comprising a lubricant reservoir, a lubricant pump in the reservoir having an inlet for entry of lubricant from the reservoir and an outlet for delivery of lubricant under pressure to an outlet line, means including a power take-off shaft extending into the reservoir for driving the pump, a return line within the reservoir for diverting the pump output away from the outlet line and returning it to the reservoir, means for periodically blocking the return line for periodic delivery of lubricant under pressure to the outlet line comprising a main valve, timing mechanism for operating the main valve, and means for driving the timing mechanism from said shaft, a relief valve for the return line adapted to open when the main valve is closed in response to development of a predetermined lubricant pressure in said outlet and return lines, and means for manually blocking the return line at a point between the relief valve and the main valve whereby lubricant under pressure may be delivered to the outlet line when the main valve is open under control of the relief valve.

2. Lubricating apparatus comprising a lubricant reservoir, a lubricant pump in the reservoir having an inlet for entry of lubricant from the reservoir and an outlet for delivery of lubricant under pressure to an outlet line, means including a power take-off shaft extending into the reservoir for driving the pump, a return line within the reservoir for diverting the pump output away from the outlet line and returning it to the reservoir, means for periodically blocking the return line for periodic delivery of lubricant under pressure to the outlet line comprising a rotary valve adapted to block the return line during a part of each revolution and to unblock the return line during the remainder of each revolution, speed-reducing ratchet mechanism for operating the valve, and means for driving the ratchet mechanism from said shaft, a relief valve for the return line adapted to open during said part of each revolution of the valve in response to development of a predetermined lubricant pressure in said outlet and return lines, and means for manually blocking the return line at a point between the relief valve and the rotary valve whereby lubricant under pressure may be delivered to the outlet line during said remainder of each revolution of the rotary valve under control of the relief valve.

3. Lubricating apparatus comprising a lubricant reservoir consisting of a receptacle and a head on the receptacle, a plunger pump carried by the head extending down into the receptacle, said pump having an inlet for entry of lubricant from the receptacle and an outlet in communication with an outlet passage in the head, a power take-off shaft extending through the head into the reservoir for driving the pump from the shaft, a rotary disk valve in the reservoir carried by the head, said disk valve having an arcuate groove in one face thereof, said groove extending on an arc centered in the disk axis for less than 360° whereby said disk valve has an ungrooved region between the ends of the groove, a return line within the reservoir for diverting the pump output away from the outlet line and returning it to the reservoir, means at the end of the return line fixed with respect to the disk valve and engaging said one face of the disk valve on the radius of the groove and adapted for sealing engagement with the ungrooved region of the valve disk and for establishing communication from the return line to the groove, timing mechanism carried by the head in the reservoir and driven by the shaft for rotating the disk valve at a slow rate relative to said shaft, valve means in the return line carried by the head in the reservoir, said valve means comprising a relief valve adapted to open when said means at the end of the return line is in sealing engagement with said ungrooved region of the disk valve, in response to development of a predetermined lubricant pressure in the outlet passage and the return line, and said valve means further comprising a manually operable valve for blocking the return line at a point between the relief valve and the disk valve whereby lubricant under pressure may be delivered to the outlet passage under control of the relief valve when said means at the end of the return line is in communication with said groove.

4. A lubricating apparatus as set forth in claim 3, wherein the pump is driven from the shaft by means of a mechanism including an eccentric at the end of the shaft in the reservoir, wherein the timing mechanism is a speed-reducing ratchet mechanism, and wherein the means for driving the ratchet mechanism includes a crank at said end of the shaft, and a link connecting the crank and the ratchet mechanism.

References Cited in the file of this patent

UNITED STATES PATENTS

| | | |
|---|---|---|
| 1,900,754 | Blanchard | Mar. 7, 1933 |
| 1,979,370 | Davis | Nov. 6, 1934 |
| 2,047,352 | Blanchard | July 14, 1936 |
| 2,063,903 | Bijur | Dec. 15, 1936 |
| 2,219,681 | Davis | Oct. 29, 1940 |
| 2,245,860 | Hunting | June 17, 1941 |